United States Patent
Reilly et al.

[11] Patent Number: 5,108,152
[45] Date of Patent: Apr. 28, 1992

[54] SEAT BELT CUSHIONING DEVICE

[76] Inventors: Robert J. Reilly; Lisa G. Reilly, both of 47 Merton St., Brockton, Mass. 02402

[21] Appl. No.: 728,844

[22] Filed: Jul. 9, 1991

Related U.S. Application Data

[63] Continuation of Ser. No. 487,644, Mar. 2, 1990, abandoned.

[51] Int. Cl.⁵ .................. A47D 15/00; B60R 22/10
[52] U.S. Cl. .................................. 297/482; 297/397; 297/484
[58] Field of Search ............... 297/391, 393, 397, 482, 297/484

[56] References Cited

U.S. PATENT DOCUMENTS

| | | | |
|---|---|---|---|
| 4,097,086 | 6/1978 | Hudson | 297/217 |
| 4,619,468 | 10/1986 | Spill | 297/482 X |
| 4,738,488 | 4/1988 | Camelio | 297/391 X |
| 4,779,930 | 10/1988 | Rosen | 297/391 X |
| 4,838,611 | 6/1989 | Talaugon | 297/482 X |

Primary Examiner—Peter R. Brown
Attorney, Agent, or Firm—Herbert L. Bello

[57] ABSTRACT

A one piece cushioning device for a child's car seat has a main body defining a head rest and a pair of extending arms that define a pair of shoulder belt covers. Each arm is sized and shaped to fit around a shoulder belt of the car seat, closures being provided to secure the arms around the shoulder belts. The main body is positioned between a child's head and the back of the car seat and serves as a cushion to protect against irritation to the child's head and the arms protect against irritation to the child's neck.

17 Claims, 2 Drawing Sheets

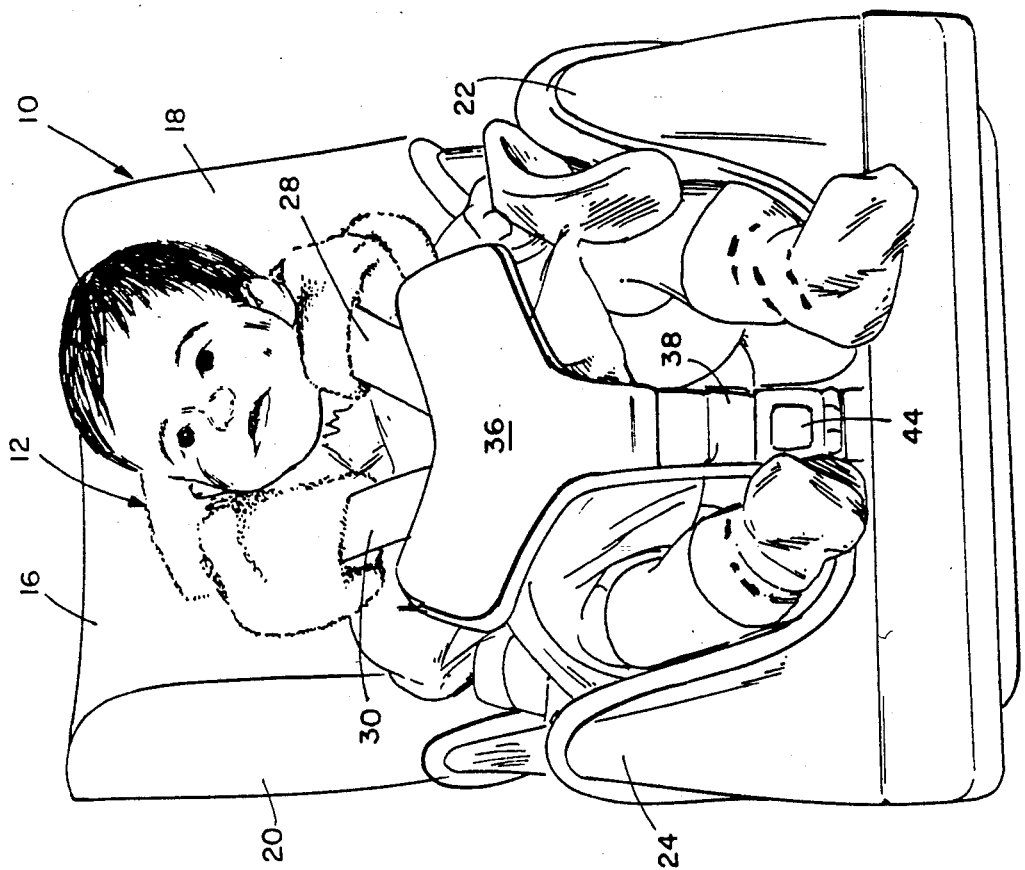
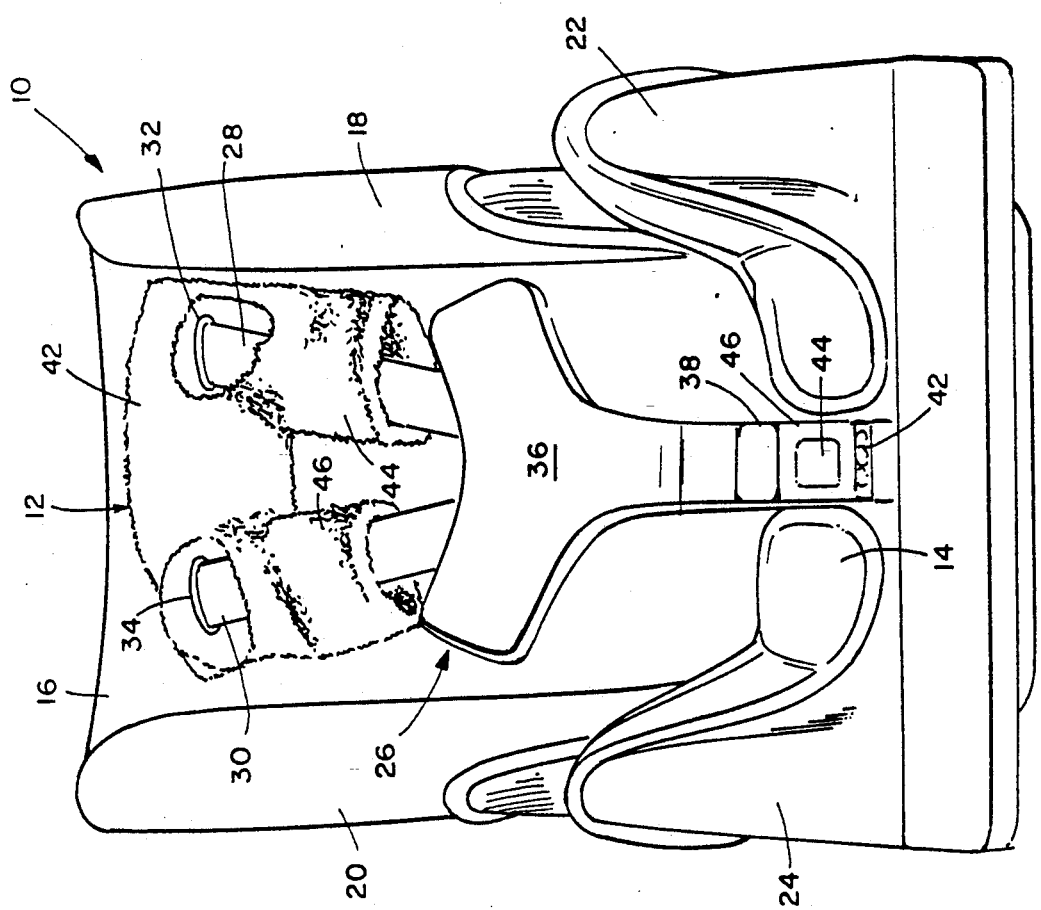

SEAT BELT CUSHIONING DEVICE

This application is a continuation of U.S. Pat. Application Ser. No. 487,644, filed Mar. 2, 1990, now abandoned.

BACKGROUND OF THE INVENTION
1. Field of Invention

The present invention relates to car seats for infants and small children and, more particularly, is directed towards a cushioning device for protecting the neck and head of a child in a car seat against irritation.

2. Description of the Prior Art

Federal law requires use of car seats by infants and children under the age of four. Generally speaking, car seats are primarily designed to meet federal standards of safety, the comfort of the child is a secondary consideration. A variety of protective and decorative devices for car seat belts are shown in prior art patents, for example, U.S. Pat. Nos. 3,397,913; 3,957,282; 4,678,205; 4,693,495; 4,741,574; and 4,848,793. Children's car seats suffer from the disadvantage that the shoulder belts rub against the child and cause discomfort. The shoulder belts rub against and irritate the child's neck and shoulder area. Further irritation is caused to the neck and shoulders when the infant or child moves or tries to move while being restrained in the car seat. In such a case, the belts dig into and rub against the sides of the neck and shoulders. When the infant or child falls asleep, his/her head and cheeks rub on the top side of the shoulder belt, thus causing further skin irritation. In addition, the back of the child's head may be irritated by rubbing against the back of the car seat or the shoulder belt grommets or bushings in the back of the car seat. A need exists for a seat belt cushioning device which will protect a child against such irritation.

SUMMARY OF THE INVENTION

It is an object of the present invention to provide a one piece cushioning device for an infant's or child's car seat which will prevent the discomfort caused by such car seats.

It is another object of the present invention to provide a one piece cushioning device for use with an infant's or child's car seat which protects the infant or child against irritation caused by rubbing against the shoulder belts.

It is a further object of the present invention to provide a one piece cushioning device for use with an infant's or child's car seat which protects the infant or child from skin irritation of the neck, cheeks and head caused by rubbing against the shoulder belts and back of the car seat.

These and other objects of the invention are achieved by a one piece cushioning device that is composed of a soft material and includes a main body defining a head rest and a pair of extending arms that define a pair of shoulder belt covers. The main body of the cushioning device rests against the back of the car seat and the extending arms are folded longitudinally and secured about the shoulder belts. Closures are provided on the arms to secure the arms about the shoulder belts, the closures being on the outside edge of the arms when folded about the shoulder belts. When the infant or child is placed in a car seat having the cushioning device installed therein, the infant's or child's head rests against and is protected by the main body of the cushioning device and the extending arms that are wrapped about shoulder belt protect against irritation that would be caused by rubbing of the shoulder belts.

The invention accordingly comprises the devices and systems, together with their parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein:

FIG. 1 is a perspective view of a car seat with a cushioning device embodying the invention;

FIG. 2 is a perspective view of the car seat of FIG. 1 with a child secured therein;

DETAILED DESCRIPTION OF THE PREFERRED EMBODIMENTS

Figure 3:
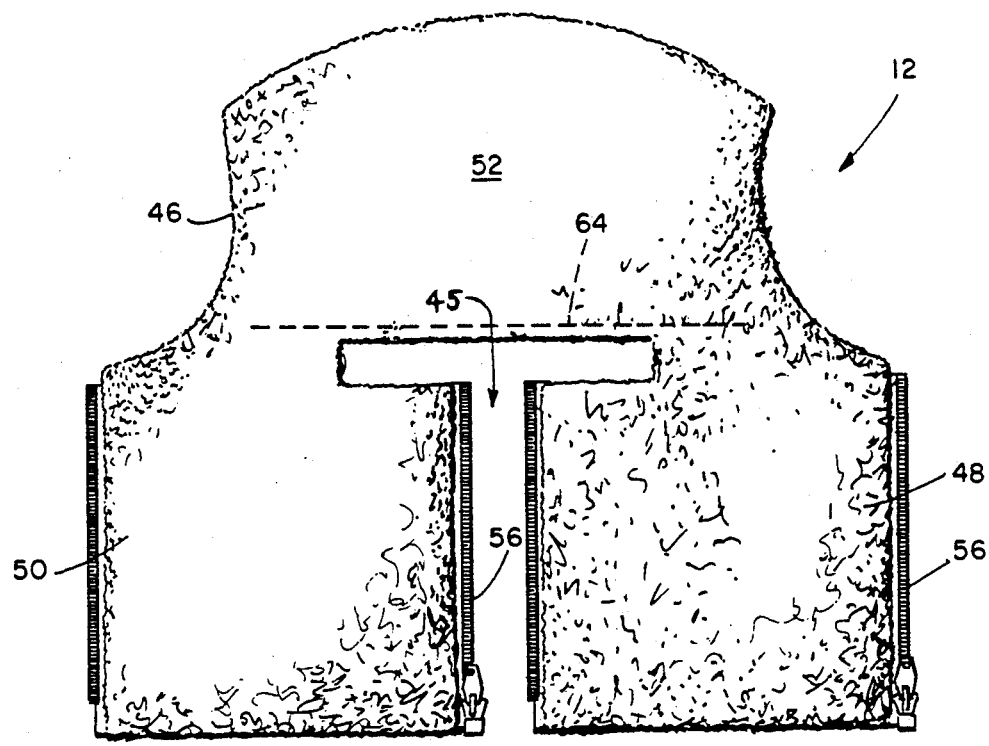
FIG. 3 is a plan view of the cushioning device of FIG. 1 with the arms in the open or unfolded position.

Referring now to the drawings, particularly FIGS. 1 and 2, there is shown a car seat 10 having a cushioning device 12 embodying the present invention attached thereto. Car seat 10 has a seat portion 14; a back portion 16; side rests 18,20; side arms 22,24; and a harness assembly 26.

As best shown in FIG. 2, harness assembly 26 is configured to restrain a child in seat 10 and cushioning device 12 protects the exposed skin areas from irritation. Harness assembly 26 includes a pair of shoulder belts or straps 28,30 that are anchored to a frame (not shown) of car seat 10. Straps 28,30 are threaded through a pair of grommets or bushings 32,34, respectively, in seat back 16. The straps 28,30 extend forwardly and downwardly over the shoulders and chest of a child in car seat 10. The free ends of straps 28,30 are secured to a tongue assembly 36 having a tongue 38 that is configured to lock with a buckle 40 which is attached to one end of a crotch strap 42. The other end of crotch strap 42 is attached to the frame of car seat 10. Buckle 40 is provided with a button 44 which, when pushed, unlocks tongue 38 and releases tongue assembly 36.

Figures 4, 5:
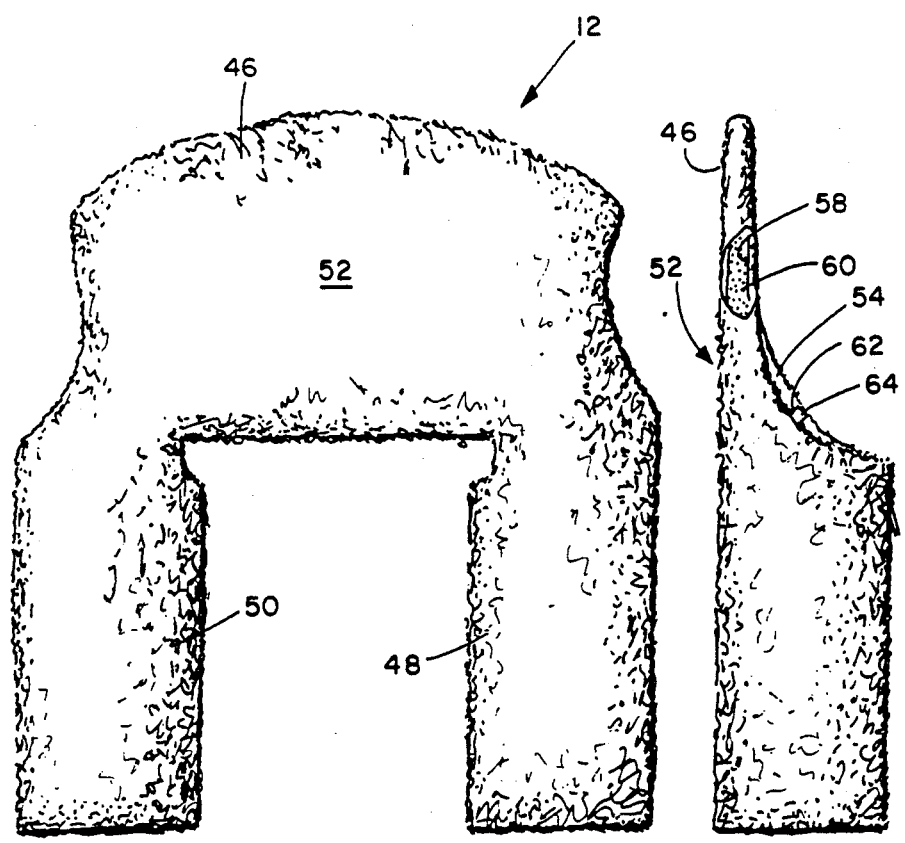
FIG. 4 is a view of the cushioning device of FIG. 3 with the arms shown in the closed or folded position.
FIG. 5 a side view of FIG. 4.

As best shown in FIGS. 3-5, cushioning device 12 is formed from a single piece of soft material 52, for example, a piece of fleece having a flannel lining 54 (FIG. 5). A substantially T-shaped section 45 is cut out of fleece 52 to form a main body 46 and a pair of arms 48,50 that depend from opposite side edges of the main body in substantially parallel relationship to one another. Flannel lining 54 is cut in a matching configuration and secured to fleece 52 by sewing, for example. Each arms 48, and 50 is provided with a fastener 56, for example, a zipper or a hook and loop fastener or snaps, that is secured to opposite side edges thereof. When zipper 56 is closed, as shown in FIGS. 1, 2 and 4, arms 48 and 50 form tubular members that are sized to fit about straps 28 and 30, respectively. As shown in FIG. 2, arms 48 and 50 are sufficiently long so that they extend over the child's shoulder. Typically, arms 48 and 50 are approximately 6 inches long and 6 inches wide when unfolded. Main body 46, which forms a pillow or cushion against which a child's head rests when the child is secured in seat 10, is approximately 8 inches wide and 5 inches high. If desired, pillow 46 is formed with an internal chamber or pocket 58 that is filled with a polyester foam 60 or other suitable cushion material. Chamber 58 is closed by sewing or by using some other closure means such as a zipper, a hook and loop fastener or snaps. In the illustrated embodiment, chamber 58 is accessible through an opening 62 that is closed with a fastening element 64, for example a zipper or a hoop and loop fastener.

In securing cushioning device 12 to car seat 10, the cushioning device is positioned on the car seat on top of straps 28,30. Arms 48 and 50 are folded around straps 28,30, respectively, and zippers 56 are closed so that the arms are secured about the straps. As shown in FIG. 2, arms 48 and 50 are positioned on either side of the child's neck and prevent straps 28,30 from rubbing against the child's neck. In addition, arms 48 and 50 of cushioning device 12 prevent straps 28,30 from rubbing against the child's cheeks. The child's head rests against pillow 46 and the fleece protects the child's head from rubbing against the seat back 16 and bushings 32,34. It will be readily appreciated that cushioning device 12, when installed, is constrained for limited movement relative to straps 28,30. The ends of the arms 48,50 limit forward or downward movement and the top edge of pillow 46 limit backward or upward movement.

In order to place a child in seat 10 having cushioning device 12, button 44 is pressed, tongue 38 is unlocked and tongue assembly 36 is released from buckle 44. Tongue assembly 34 is lifted out of the way to allow positioning of the baby in car buckle 44. Arms 48 and 50 are positioned on opposite sides of the child's neck and pillow 56 is located behind the child's head. In this way, the child is secured in car seat 10, and the child's neck and head are protected by cushioning device 12 against irritations caused by rubbing against straps 28,30, seat back 16 and bushings 32,34.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A cushioning device for use with a car seat having a seat, a back and a pair of shoulder straps, said device comprising:
   (a) a soft piece of material with a cutout having a main body that defines a pillow and a pair of arms extending from said main body, said arms having a planar shape with opposed side edges, the sides of said cutout being the inner edges of said arms and a portion of a bottom edge of said pillow; and
   (b) fastening means on said side edges of each said arm for forming a pair of protective members, each said protective member sized and shaped to fit around one of the shoulder straps, each said protective member being sufficiently long so that it extends over the shoulders of a child restrained in the car seat when said protective members are fitted about the straps, said main body s positioned on the back of the car seat to protect the head of a child that is restrained in the car seat from rubbing against the back of the car seat, each said protective member being sufficiently long so that each said protective member is disposed along a length of the shoulder straps a sufficient distance that it protects the child's neck from rubbing against the straps and becoming irritated.

2. The cushioning device as claimed in claim 1 wherein said fastening means is a zipper.

3. The cushioning device as claimed in claim 1 wherein said fastening means is hook and loop fastening means.

4. The cushioning device as claimed in claim 1 wherein said soft material is fleece.

5. The cushioning device as claimed in claim 1 wherein said soft material is fleece with a flannel lining.

6. The cushioning device as claimed in claim 1 wherein said main body is formed with a pocket, said pocket being configured to be filled with a cushion material, said filled pocket defining a pillow for the child's head.

7. A cushioning device for use with a shoulder strap assembly that is used to restrain a child in a car seat, said device comprising:
   (a) a cushion material having a main body and at least one extending arm, said arm having a planar shape with opposed side edges;
   (b) fastening means disposed along the side edges of said arm for securing said cushioning device about a shoulder strap, said cushion material positioned about the shoulder strap and arm forming a tubular member when said fastening means is closed, said tubular member sized and shaped to fit around the shoulder strap, said cushioning device constrained for limited movement relative to the strap when said fastening means is closed when said arm is fitted about the shoulder strap, said arm being sufficiently long so that said tubular member is disposed along a length of the shoulder strap a sufficient distance to protect a child's neck from rubbing against the shoulder strap and said main body is positioned to protect the child's head from rubbing against the back of the car seat.

8. The cushioning device as claimed in claim 7 wherein said fastening means is a zipper.

9. The cushioning device as claimed in claim 7 wherein said fastening means is a hook and loop fastening means.

10. The cushioning device as claimed in claim 6 wherein said cushion material is fleece.

11. The cushioning device as claimed in claim 7 wherein said cushion material is fleece with a flannel lining.

12. A cushioning device for use with a child's car seat, the car seat having a seat, a back and a pair of shoulder straps for restraining a child in the car seat, said device comprising:
   (a) a soft piece of material with a somewhat T-shaped cutout, said material having a main body that defines a pillow and a pair of extending arms that define shoulder strap covers, the sides of said T-shaped cutout being the inner edges of said arms and a portion of a bottom edge of said pillow;
   (b) fastening means on opposed side edges of each said arm for holding said side edges together to form a tubular member, each said tubular member is sized and shaped to fit around a shoulder strap, said cushioning device constrained for limited movement relative to the strap when said arms are fitted around the straps, each said arm being sufficiently long so that it extends over the shoulders of a child restrained in the car seat, said main body is positioned against the back of the car seat to protect a child's head and said arms are positioned along a length of the shoulder strap to protect the child's neck from rubbing against the strap.

13. The cushioning device as claimed in claim 12 wherein said soft material is fleece.

14. The cushioning device as claimed in claim 12 wherein said soft material is fleece with a flannel lining.

15. The cushioning device as claimed in claim 12 wherein said main body has a pocket that is configured to be filled with a cushion material, said pocket defining a pillow for the child's head.

16. The cushioning device as claimed in claim 15 wherein said pocket is filled with a cushion material.

17. The cushioning device as claimed in claim 16 wherein said cushion material is a polyester foam.

* * * * *